(No Model.) 3 Sheets—Sheet 2.
T. W. EVANS.
FLUID PRESSURE BRAKE MECHANISM.
No. 546,134. Patented Sept. 10, 1895.
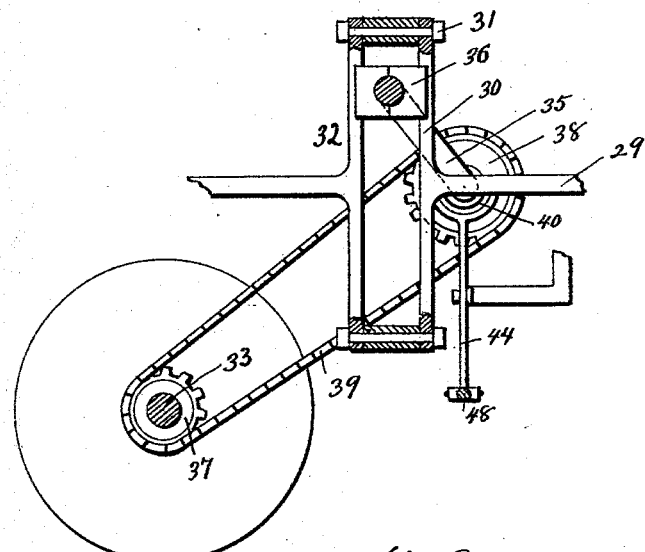
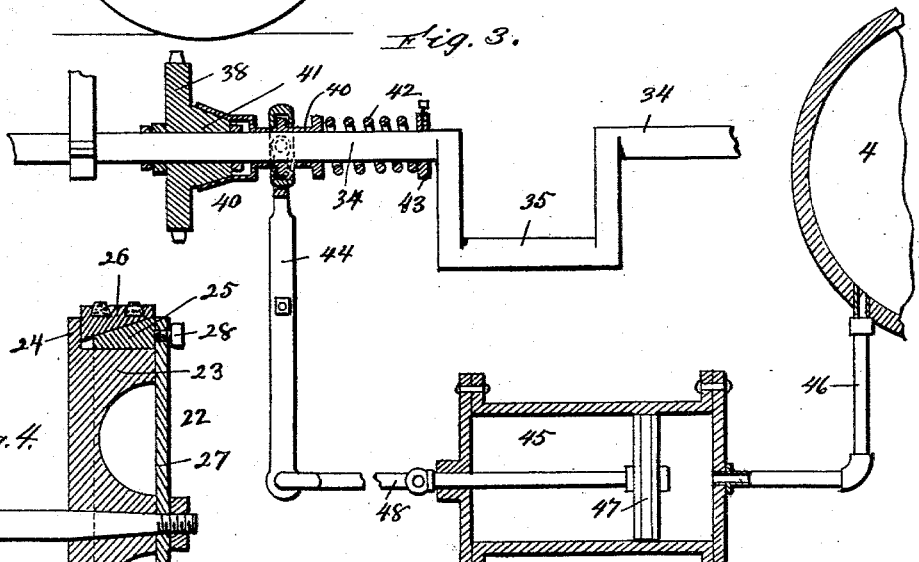
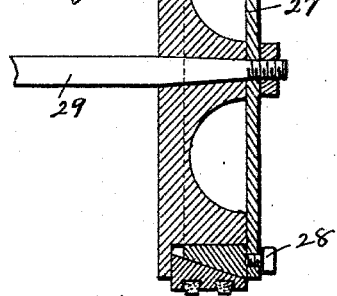

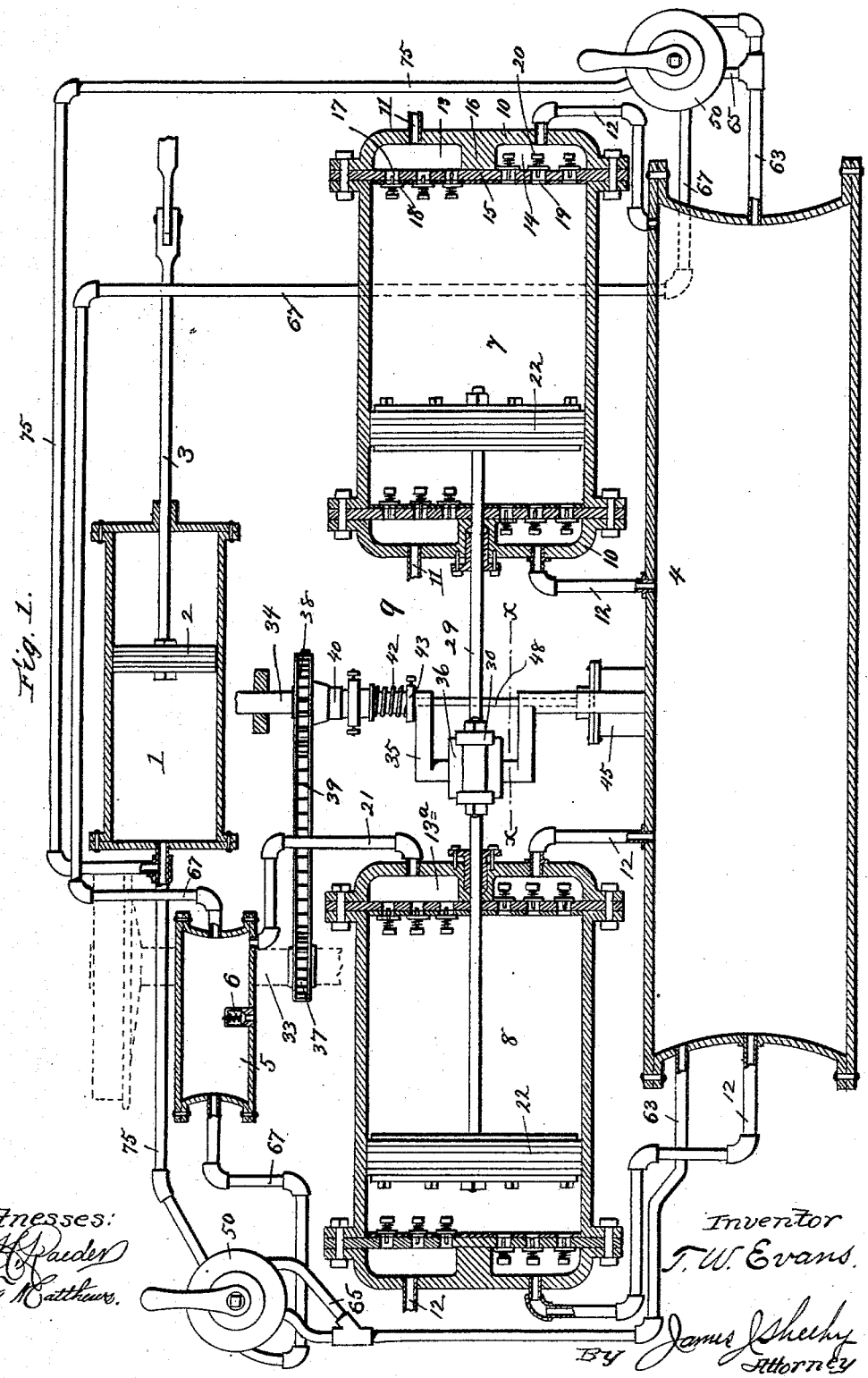

(No Model.)  3 Sheets—Sheet 3.
T. W. EVANS.
FLUID PRESSURE BRAKE MECHANISM.
No. 546,134. Patented Sept. 10, 1895.
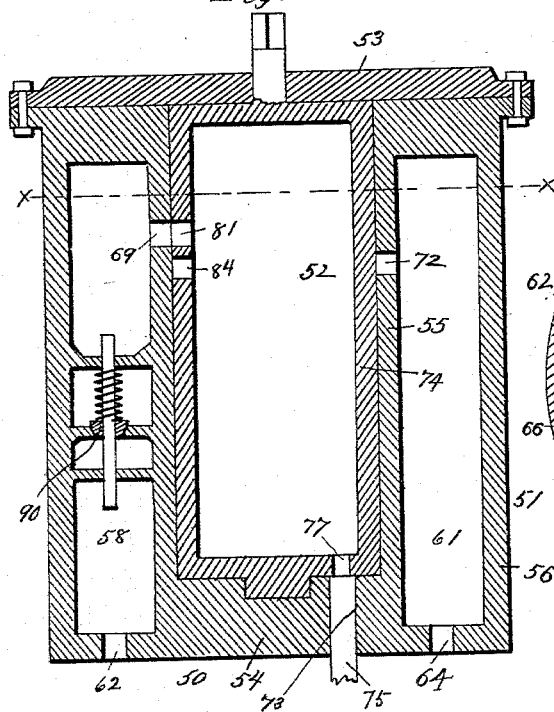
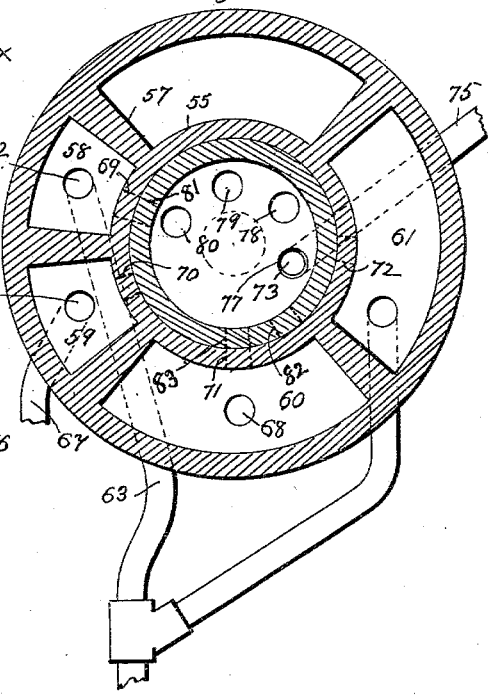
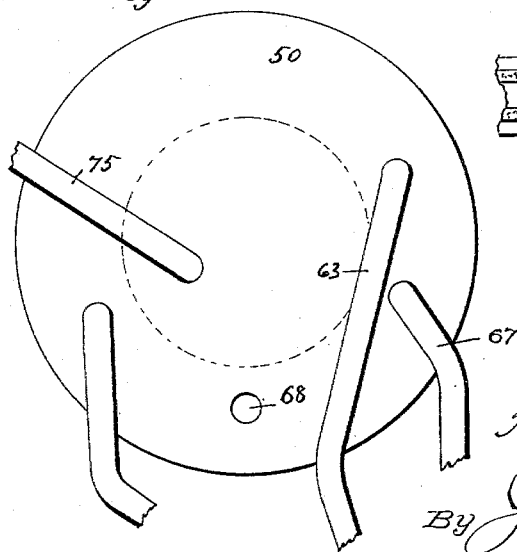
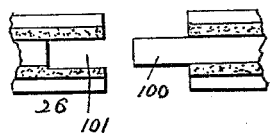
Witnesses:
Inventor
T. W. Evans
By James J. Sheehy
Attorney

UNITED STATES PATENT OFFICE.

THOMAS WALSTON EVANS, OF NEW ORLEANS, LOUISIANA.

FLUID-PRESSURE BRAKE MECHANISM.

SPECIFICATION forming part of Letters Patent No. 546,134, dated September 10, 1895.

Application filed May 28, 1895. Serial No. 550,935. (No model.)

*To all whom it may concern:*

Be it known that I, THOMAS WALSTON EVANS, a citizen of the United States, residing at New Orleans, in the parish of Orleans and State of Louisiana, have invented certain new and useful Improvements in Fluid-Pressure Brake Mechanism; and I do declare the following to be a full, clear, and exact description of the invention, such as will enable others skilled in the art to which it appertains to make and use the same.

My invention relates to improvements in that class of fluid-pressure brake mechanism which is designed more particularly for use upon street-railway cars; and its novelty and many advantages will be fully understood from the following description and claims, when taken in connection with the annexed drawings, in which—

Figure 1 is a diagrammatic view of my improved apparatus with parts in section. Fig. 2 is a detail section taken in the plane indicated by line $xx$ of Fig. 1. Fig. 3 is a detail view illustrating the pulley loosely mounted on the crank-shaft and the clutch mechanism for fixing the same on the crank-shaft. Fig. 4 is a detail section of one of the air-compressor pistons; and Fig. 5 is a vertical diametrical section of one of the operating-valves, taken in the plane indicated by the line $yy$ of Fig. 6, looking in direction of arrow. Fig. 6 is a horizontal section taken in the plane indicated by line $xx$ of Fig. 4. Fig. 7 is an inverted plan view of the valve, and Fig. 8 is a detail view of piston-ring.

Referring by numerals to said drawings, 1 indicates the brake-cylinder of my improved apparatus, which is provided with the usual piston 2 and piston-rod 3, designed to be connected with brake-levers. (Not illustrated.)

4 indicates the compressed-air reservoir.

5 indicates the vacuum-chamber, which is provided with the inwardly-opening regulating-valve 6 and is designed to serve a purpose presently described, and 7 8 indicate the piston-cylinders of the air-compressor 9. The piston-cylinder 7 of the compressor is provided in its opposite heads 10 with air-induction apertures 11 and with apertures to receive the pipes 12, which connect it with the reservoir 4, and said cylinder is also provided at its opposite ends with chambers 13 14, which communicate with the apertures 11 and pipes 12, respectively, and are formed by the heads 10, diaphragms 15, and partition-walls 16. The portions of the diaphragms 15 which form the chambers 13 are provided with a plurality of apertures 17, controlled by inwardly-opening valves 18, designed to permit air to enter the cylinder from chambers 13 and prevent it from passing out, while the portions of said diaphragms which form the chambers 14 are provided with a plurality of apertures 19, controlled by outwardly-opening valves 20, designed to permit air to pass from the interior of the cylinder to chambers 14 and check its return. By reason of this construction it will be observed that when the piston in cylinder 7 moves in either direction air will be drawn into the interior of the cylinder through the chamber 13 at one end of the cylinder, and at the same time air will be forced through the chamber 14 at the opposite end of the cylinder into the air-reservoir, and consequently it will be appreciated that each movement of the piston operates to compress air in the reservoir 1. The compressor-cylinder 8 is similar in all respects to the cylinder 7, with the exception that one of its air-induction chambers, numbered $13^a$, is, instead of being connected with the open air, connected by a pipe 21 with the vacuum-chamber 5, so that the piston in said cylinder will operate to exhaust the air from said vacuum-chamber. In practice the compressor-cylinders 7 8 are arranged in alignment, as shown in Fig. 1, for a purpose presently understood, and they are respectively provided, as before mentioned, with a piston 22. It is essential that these pistons 22 should fit the interior of the cylinders 7 8 very tightly, so as to prevent the air from escaping past them, and I therefore prefer to make said pistons with the body portion 23, having the peripheral flange 24, the ring 25 arranged around the body-portion 23, and having its outer side beveled, the split and beveled ring 26 arranged around the ring 25 and interposed between said ring and the body-flange 24, and having grooves in its outer side to receive antifriction metal and also having the tongue 100 at one end to enter the recess 101 in its opposite end, (see Fig. 8,) the plate 27 and the screws 28 extending through the plate 27 and bearing against the edge of the ring 25. This construction of piston permits of wear of the ring 26 being taken up, it being simply necessary when said ring is worn so that it fits the cylinder loosely to turn the screws 28 so as to move the beveled ring 25, and through the medium of the same force the ring 26 outwardly until it bears tightly against the interior of the cylinder. The pistons 22 of the two cylinders 7 8 are suitably secured upon piston-rods 29, and these rods are provided at their contiguous ends with angularly-disposed rods 30, which are connected by bolts 31 or other suitable means, and serve in conjunction with the same to form a frame 32, the purpose of which will hereinafter be described.

33 indicates one of the axles of a car, which may be of the ordinary construction.

34 indicates a shaft which is provided at an intermediate point of its length with a crank 35.

36 indicates a slide mounted on the crank 35 and arranged to reciprocate in the frame 32.

37 indicates a sprocket-wheel fixed on the car-axle 33.

38 indicates a sprocket-wheel loosely mounted on the crank-shaft 34, and adapted to be fixed with respect thereto in a manner presently described, and 39 indicates a sprocket-belt. This belt 39 takes around the sprocket-wheel 37 on axle 33 and the sprocket-wheel 38 on shaft 34, and it will therefore be seen that when the car is in motion and the wheel 38 is fixed to turn with the shaft 34 the said shaft will be rotated, and through the medium of its crank will reciprocate the slide 36 in the frame 32, and in consequence will reciprocate the pistons 22 in the cylinders 7 8, so as to charge the reservoir 4 with compressed air and exhaust the air from the vacuum-chamber in the manner before described. This utilization of the rotation of the car-axle 33 to charge the compressed-air reservoir 4 is one of the important features of my invention, and an equally important feature is the mechanism through the medium of which the compression of air is automatically suspended when the pressure in the reservoir reaches a certain predetermined point. This mechanism is better illustrated in Fig. 3 of the drawings, and it comprises the clutch 40, which is keyed or feathered on the crank-shaft 34 so as to turn therewith and slide thereon, and is adapted to frictionally engage the hub 41 of the loose sprocket-wheel 38, the coiled spring 42, which surrounds the shaft 34 and is interposed between an adjustable collar 43 and the end of the clutch, so as to normally force and hold said clutch against the hub of the wheel 38, the lever 44, which is fulcrumed at an intermediate point of its length and is connected with the clutch 40, the piston-cylinder 45, which is connected by the pipe 46 with the air-reservoir, and the piston 47, arranged in said cylinder 45 and connected by its rod 48 with the lever 44.

The clutch 40 is held against the hub 41 of wheel 38, and in consequence the air-compressing devices are operated so long as the pressure in the reservoir 4, acting against the piston 47 in cylinder 45, is insufficient to overcome the spring 42. When, however, the pressure in the reservoir 4 is sufficient to overcome the spring 42 it will act against the piston 47, and through the medium of the same and the lever 44 will move the clutch 40 away from and out of engagement with the wheel 38, so as to enable said wheel to turn loosely on its shaft. When the pressure in the reservoir 4 is reduced by the withdrawal of air to apply the brakes, the spring 42 will force the clutch 40 against the wheel 38, and the compression of air will be resumed until the pressure in the reservoir reaches the predetermined point, when it will be automatically suspended, as before described. In this way an ample pressure is maintained in the reservoir 4 at all times, and all danger of bursting said reservoir is obviated, which is an important desideratum.

The maximum degree of pressure to be maintained in the reservoir 4 may be regulated by adjusting the collar 43 on shaft 34, it being simply necessary when a high pressure is desired to move said collar toward the wheel 38, so as to increase the strength of spring 42 and adjustably fix it in position, and when a low pressure is desired to move the collar away from wheel 38 and adjustably fix it in position.

50 indicates the operating-valves, of which there are two employed, one being preferably placed at each end of a car. These valves 50 are similar in construction and are similarly connected with the reservoir 4, vacuum-chamber 5, and brake-cylinder 1, and therefore a description of the valve shown in detail in Figs. 1, 5, 6, and 7 will suffice for both. This valve 50 comprises a casing 51, preferably of circular form in cross-section, and a rotary plug 52 arranged in the casing. The said casing 51 is formed by the top and bottom walls 53 and 54, an inner wall 55, and an outer wall 56, and the space between said inner and outer walls is divided by vertical partition-walls 57 into chambers 58, 59, 60, and 61, arranged in succession in a circular series, as better shown in Fig. 5 of the drawings. The chamber 58 is provided in its bottom with an aperture 62 to receive the pipe 63 leading from the air-reservoir 4, the chamber 61 is provided in its bottom with a similar aperture 64 to receive a branch-pipe 65 communicating with the pipe 63, the chamber 59 is provided in its bottom with an aperture 66 to receive a pipe 67 leading from the vacuum-chamber 5, and the chamber 60 is provided in its bottom with an exhaust-port or opening 68. The chamber 58 is further provided in its inner side wall 55 with an aperture 69, the chamber 59 is provided in its inner side wall with an aperture 70, the chamber 60 is provided in its inner side wall with an aperture 71, and the chamber 61 is provided in its inner side wall with an aperture 72.

Formed in the bottom wall 54 of the casing 51 is a port or passage 73, which communicates with the interior chamber 74 of the valve-casing, and is designed for the connection of the pipe 75 leading to the brake-cylinder 1, and arranged in the said chamber 74 is the valve-plug 52, which is provided with a suitable handle 76, as shown. Said valve-plug is hollow, and it is provided in its lower end with the ports 77, 78, 79, and 80, preferably arranged as shown, and designed to be registered with the port or passage 73, and it is also provided in its vertical side wall with the ports 81, 82, 83, and 84. The latter ports are so arranged, as shown, that when the port 77 registers with passage 73 the port 81 will register with casing-port 69, so as to permit air to pass from reservoir 4 to brake-cylinder 1 and apply the brakes, when port 78 registers with passage 73 the port 82 will register with casing-port 71, so as to permit air to pass from brake-cylinder to the open air, when port 79 registers with passage 73 the port 83 will register with casing-port 70, so as to permit the air in brake-cylinder back of piston to rush into vacuum-cylinder, which will result in said piston and its connections being quickly returned to and held in their normal released positions, and when port 80 registers with passage 73 the port 84 will register with casing-port 72, so as to permit a great volume of air to pass from the reservoir to the brake-cylinder, so as to effect an emergency application of the brakes.

The chamber 58, which I term the "service-chamber," because it is used in making service applications of the brakes, is provided with a check-valve 90, as shown, whereby it will be seen that the operator is enabled in making a service-stop to let the air into the brake-cylinder gradually, or step by step, and check it there, so as to make a gradual stop, as is desirable when there is no need to powerfully and suddenly check the movement of the car.

As before stated, one of my improved valves is arranged at each end of the car, and is connected with the other parts in the manner described, and it will, therefore, be seen that my improvements do not interfere with either end of the car being used as the forward end. I prefer, however, in practice, to have the handles of the valves made removable, so that when one valve is not in use mischievous persons cannot apply the brakes through the medium of the same.

It will be observed from the foregoing that my improvements are very cheap and simple, and it will also be observed that they may be applied to electric and other street-railway cars without materially increasing the cost and weight thereof.

It will be further observed that with my improvements the car may be quickly stopped within a very short distance, which is highly desirable in crowded cities, where it is necessary to make frequent emergency-stops to avoids casualties, and it will be still further observed that, inasmuch as the rotation of the car-axle is utilized to replenish the air-reservoir, my improvements do not add to the running-expenses of a car.

I have in some respects specifically described the construction and relative arrangement of the several elements of my improved brake apparatus in order to impart a full, clear, and exact understanding of the same; but I do not desire to be understood as confining myself to such construction and arrangement, as I reserve the right to make in practice such changes or modifications as fairly fall within the scope of the invention.

Having described my invention, what I claim is—

1. The combination in a fluid pressure brake system, of a brake cylinder, a reservoir, a vacuum chamber, and a valve connected with the brake cylinder, reservoir and vacuum chamber and adapted to effect communication between the reservoir and brake cylinder to apply the brakes, communication between the brake cylinder and the open air to release the brakes and communication between the brake cylinder and the vacuum cylinder to return the piston in the brake cylinder to its released position, substantially as specified.

2. The combination in a fluid pressure brake system, of a brake cylinder, a reservoir, a vacuum chamber, an air compressor having an induction port connected with the vacuum chamber and a discharge port connected with the reservoir, a valve connected with the brake cylinder, reservoir, and vacuum chamber and adapted to effect communication between the reservoir and brake cylinder to apply the brakes, communication between the brake cylinder and the open air to release the brakes and communication between the brake cylinder and the vacuum chamber to return the piston in the brake cylinder to its released position, substantially as specified.

3. The combination in a fluid pressure apparatus, of a reservoir, two compressor cylinders arranged in alignment and connected with the reservoir and having pistons provided with rods, the frame 32, connected to the contiguous ends of the piston rods, a slide arranged in said frame, a rotary shaft having a crank connected to said slide, a car wheel, a wheel loosely mounted on the crank shaft, gearing intermediate of the car wheel and said loosely mounted wheel, a spring pressed clutch fixed to turn with the shaft and adapted to engage the loose wheel, a cylinder connected with the reservoir and a piston arranged in said cylinder and connected with the spring pressed clutch, substantially as and for the purpose set forth.

4. In a fluid pressure brake apparatus, a valve comprising the casing having the central chamber 74, provided in its bottom with a passage 73, adapted to be connected with a brake cylinder, the chamber 58, having the port 62, in its bottom adapted to be connected with a reservoir and also having the port 69, in its inner side wall, the check valve arranged in said chamber 58, the chamber 59, having the port 66, in its bottom adapted to be connected with a vacuum chamber and also having the port 70 in its inner side wall, the chamber 60, having the exhaust port in its bottom and also having the port 71, in its inner side wall, and the chamber 61, having the port 64, in its bottom and adapted to be connected with a reservoir, and the rotary hollow-valve plug arranged in the central chamber of the casing and having the ports 77, 78, 79, and 80, in its bottom adapted to register with the casing passage 73, and also having the ports 81, 82, 83, and 84, in its side wall adapted to register with the casing ports 69, 70, 71, and 72, respectively, substantially as and for the purpose set forth.

In testimony whereof I affix my signature in presence of two witnesses.

THOMAS WALSTON EVANS.

Witnesses:
F. J. DREYFOUS,
W. T. COATS.